United States Patent [19]

Ishii et al.

[11] Patent Number: 5,203,169
[45] Date of Patent: Apr. 20, 1993

[54] AXLE DRIVE APPARATUS

[75] Inventors: Norihiro Ishii; Hiroaki Shimizu; Toru Inoue; Takashi Yokoyama, all of Amagasaki, Japan

[73] Assignee: Kanzaki Kokyukoki Mfg. Co., Ltd., Amagasaki, Japan

[21] Appl. No.: 810,070

[22] Filed: Dec. 19, 1991

[30] Foreign Application Priority Data

Dec. 25, 1990 [JP] Japan ............................. 2-404895[U]

[51] Int. Cl.$^5$ ............................................. F16D 39/00
[52] U.S. Cl. ......................................... 60/487; 91/505
[58] Field of Search ................. 60/487, 488, 489, 490, 60/443; 91/505

[56] References Cited

U.S. PATENT DOCUMENTS

| | | | |
|---|---|---|---|
| 3,367,105 | 2/1968 | Dowty | 60/490 |
| 4,691,802 | 9/1987 | Ishimori et al. | 60/490 X |
| 4,893,524 | 1/1990 | Ohashi et al. | 74/687 |
| 4,899,541 | 2/1990 | Okada et al. | 60/487 X |
| 4,905,472 | 3/1990 | Okada | 60/464 |
| 4,922,787 | 5/1990 | Fujisaki et al. | 60/487 X |

FOREIGN PATENT DOCUMENTS

| | | | |
|---|---|---|---|
| 0373616 | 6/1990 | European Pat. Off. | |
| 1064311 | 8/1959 | Fed. Rep. of Germany | 60/490 |
| 805771 | 12/1958 | United Kingdom | 60/487 |

Primary Examiner—Edward K. Look
Assistant Examiner—Hoang Nguyen
Attorney, Agent, or Firm—Sterne, Kessler, Goldstein & Fox

[57] ABSTRACT

An axle drive apparatus of compact construction with improvements in the arrangement of the hydraulic speed change gearing and axle, and in the configuration of the transmission case. In the transmission case, there are horizontally disposed, when viewed in side elevation, a pump shaft of the HST type speed change gears on the upper side of the axle and a motor shaft of the gears on the lower side of the axle, in such a way that the shafts are longitudinally staggered. A movable swash plate is disposed below the pump shaft. The transmission case consists of two split case portions, in one of which are housed, at one side of its front portion, the HST speed change gearing and, at the other side of its rear portion, the output shaft of the motor shaft and the axle, the front portion of the one split case portion being closed by a center section, the rear portion being closed by the other case portion.

4 Claims, 6 Drawing Sheets 5,203,169

1

AXLE DRIVE APPARATUS

FIELD OF THE INVENTION

This invention relates to an axle drive apparatus of compact construction with improvements in the arrangement of the pump shaft and the motor shaft of the HST speed change gearing and in the configuration of the transmission casing.

SUMMARY OF THE INVENTION

It has been known in the art to arrange, in the transmission case, a hydraulic pump shaft driven by the engine, a hydraulic motor shaft for driving the axle, and the axle in vertically staggered parallel relation, as disclosed in, for example, European Patent Application No. 0,373,616.

In the arrangement described in European Patent Application No. 0,373,616, the hydraulic pump shaft is disposed at a high level, so that the transmission case projects considerably upward. Therefore, because of the fact that the input pulley should be disposed at a relatively low level in corresponding relation to the drive shaft of the vertical type engine, a vertical input shaft to which is fixed the input pulley is required to extend unreasonably long downward.

Another drawback of the known arrangement is that an exclusive housing in which the hydraulic pump and hydraulic motor are integrally housed is mounted to a center section. In addition, a power transmission gearing of an output gear fixed to the motor shaft and to a ring gear on the axle is supported by the center section. This increases the size of the transmission case necessary.

The center section is mounted to an opening provided at one side of the transmission case to complete the required assembly work. As such, the prior art arrangement involves a relatively large number of assembly stages. The center section is generally formed with an oil path for interconnecting the hydraulic pump and the hydraulic motor in closed circuit. Therefore, the center section is constructed of a rigid metal material capable of withstanding high hydraulic pressure, which is relatively large in mass. Accordingly, the larger the size of the center section, the greater is its weight.

The invention is intended to eliminate these drawbacks of the prior art.

DESCRIPTION OF THE PREFERRED EMBODIMENT

Figure 1:
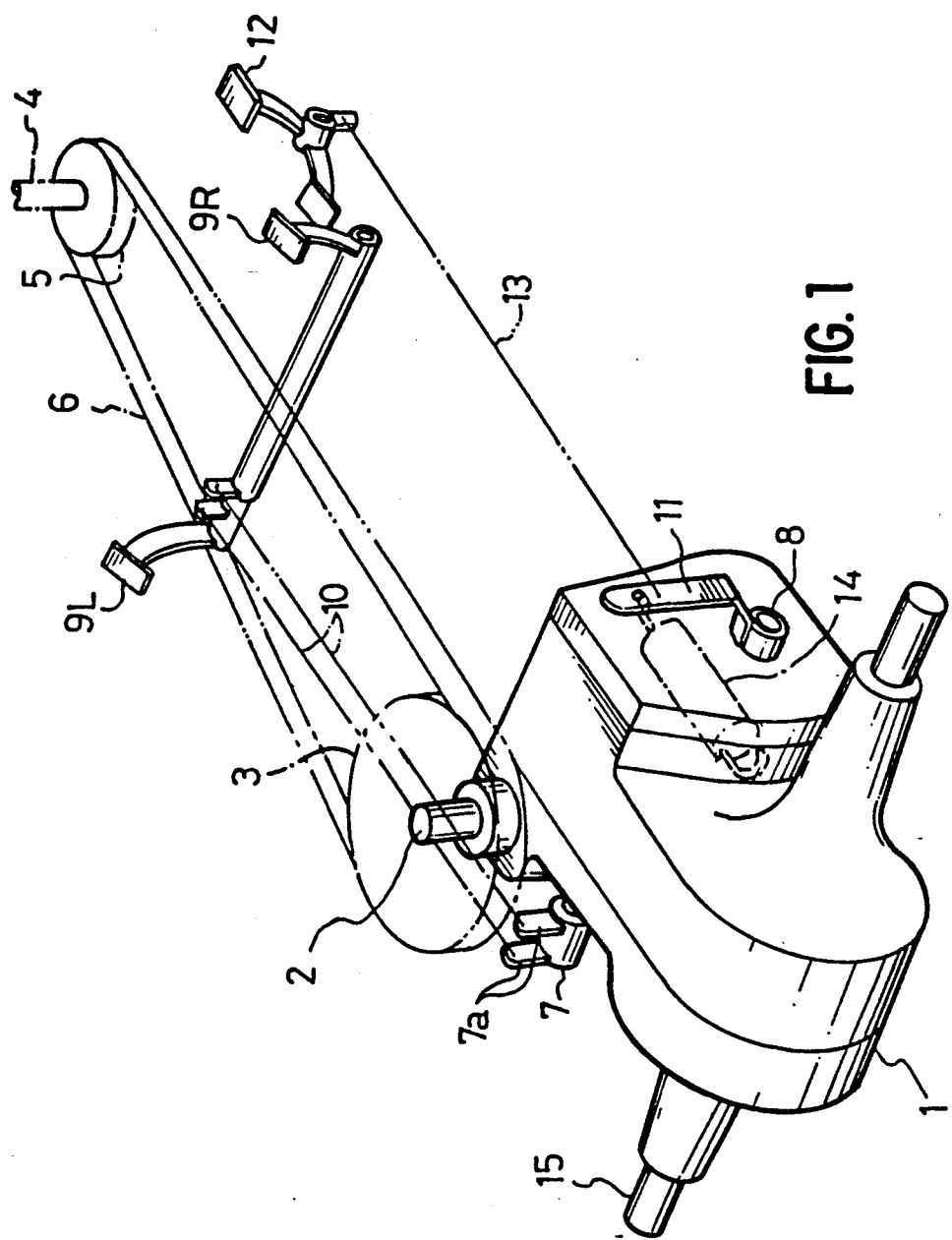
FIG. 1 is a perspective view of an axle drive apparatus embodying the invention.
Figure 2:
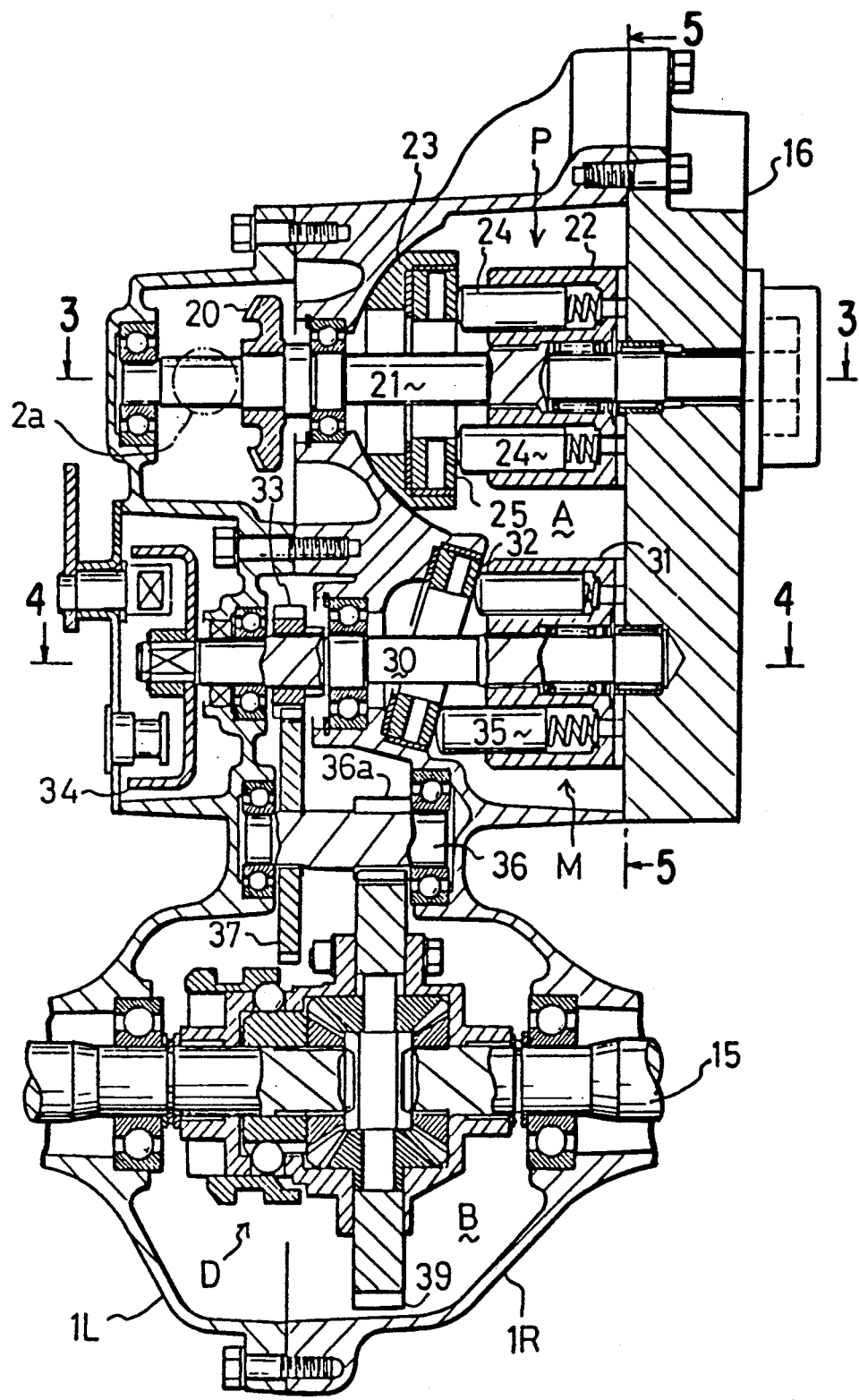
FIG. 2 is a plan view in section thereof.

In FIG. 1, an input shaft 2 projects upwardly from a front portion of a transmission case 1, and an axle 15 is horizontally disposed in a rear portion of the case 1. An input pulley 3 is securely mounted on the input shaft 2. To the input pulley 3 is transmitted power through a belt 6 from a drive pulley 5 securely mounted to a drive shaft 4 projecting from a vertical type engine (not shown). A brake shaft 7 projects from one side of the transmission case 1 and a movable swash plate control shaft 8 from the other side. The brake shaft 7 has arms 7a projecting therefrom, there being interposed rods 10 between the respective arms 7a projecting from a pivot shaft of brake pedals 9L, 9R.

A rod 13 is interposed between an arm 11 fixed to the movable swash plate control shaft 8 and a gear change pedal 12. When the gear change pedal 12 is forwardly pivoted by an HST speed change gearing to be described later, the axle 15 is rotated forward in proportion to the amount of pivotal movement of the pedal 12, whereas when the pedal 12 is rearwardly pivoted, the axle 15 is rotated backward in proportion of pivotal movement of the pedal 12. Designated by 14 is a damper for relaxing any abrupt gearing control.

The interval arrangement of the transmission case is illustrated in FIGS. 2 through 6. As shown, the transmission case is split along a plane generally perpendicular to the axle 15 to create two split case portions 1L and 1R. The HST speed change gearing is disposed in the front portion of the transmission case 1 and the axle and a gearing mechanism for power transmission are disposed in the rear portion of the case 1. The right-side split case portion 1R is formed at one side of its front portion with a first recess A for housing a hydraulic pump P and a hydraulic motor M, of the HST speed change gearing, the first recess A being tightly closed by a center section 16 constructed of a material having high vibration-absorptive properties. The case portion 1R is formed at the other side of its rear portion with a second recess B for housing gears and the like, which second recess B is tightly closed by the other case portion 1L.

Thus, the HST speed change gearing and the power transmission mechanism are separated from each other within the split case portion 1R, so that noise generation can be reduced. On both the transmission case 1 and the center section 16 are horizontally mounted a pump shaft 21, a motor shaft 30, an intermediate shaft 36, the axle 15, and the movable swash plate control shaft 8 in parallel to one another.

Figure 5:
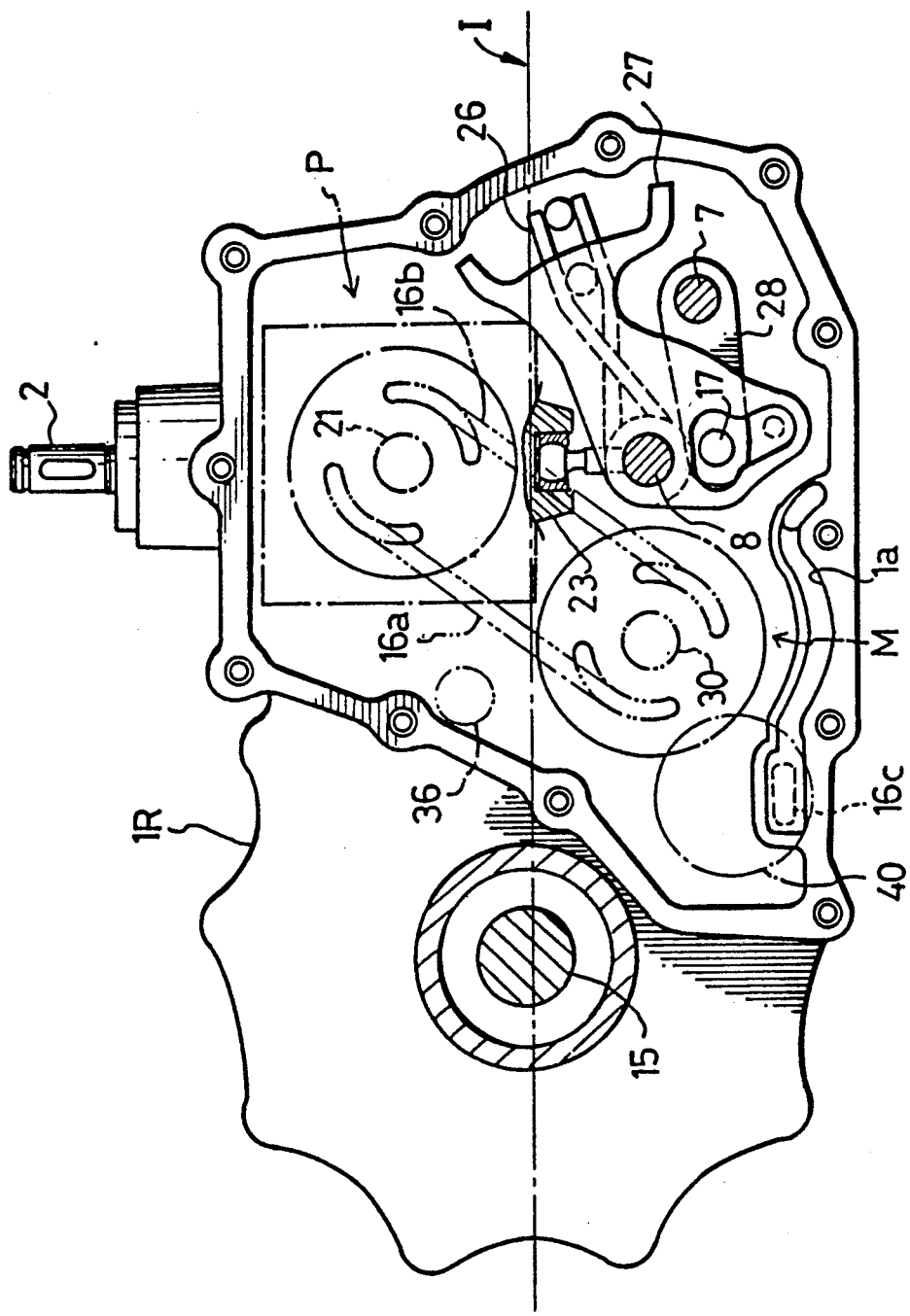
FIG. 5 is a section taken along the line 5—5 in FIG. 2.

As FIG. 5 shows, the pump shaft 21 is disposed at a position higher than an imaginary horizontal line I drawn through the axle 15, and the motor shaft 30 at a position lower than the line I of axle 15 in such a way that the pump shaft 21 and the motor shaft 30 are longitudinally staggered, whereby the height of the transmission case is limited relatively low. Axle 15 is disposed on one side of a plane perpendicular to horizontal line I, and the pump and motor are both disposed on the opposite side of that plane. The movable swash plate control shaft 8 is disposed below the pump shaft 21 to prevent the creation of any dead space within the transmission case 1.

The movable swash plate control shaft 8 is supported by both the center section 16 and the split case portion 1R so that it may be less subject to shaft deformation or the like effect and may provide improved control feeling.

The input shaft 2 extends outwardly from the front portion of the split case portion 1L and is formed at its lower end with a pinion 2a which is held in mesh engagement or geared with a bevel gear 20 fixedly mounted on the pump shaft 21. Since the pump shaft 21 and motor shaft 30 are arranged in this way, the input shaft 2 can be made relatively short.

The pump shaft 21 is supported at one end by the center section 16, and on the pump shaft 21 are fitted a cylinder 22 and a movable swash plate 23. The cylinder 22 has a plurality of pistons 24 fitted therein around the pump shaft 21. The heads of the pistons 24 are held in abutment with a bearing 25 fitted in the movable swash plate 23. Swash plate 23 is arranged perpendicular to pump shaft 21.

Figure 3:
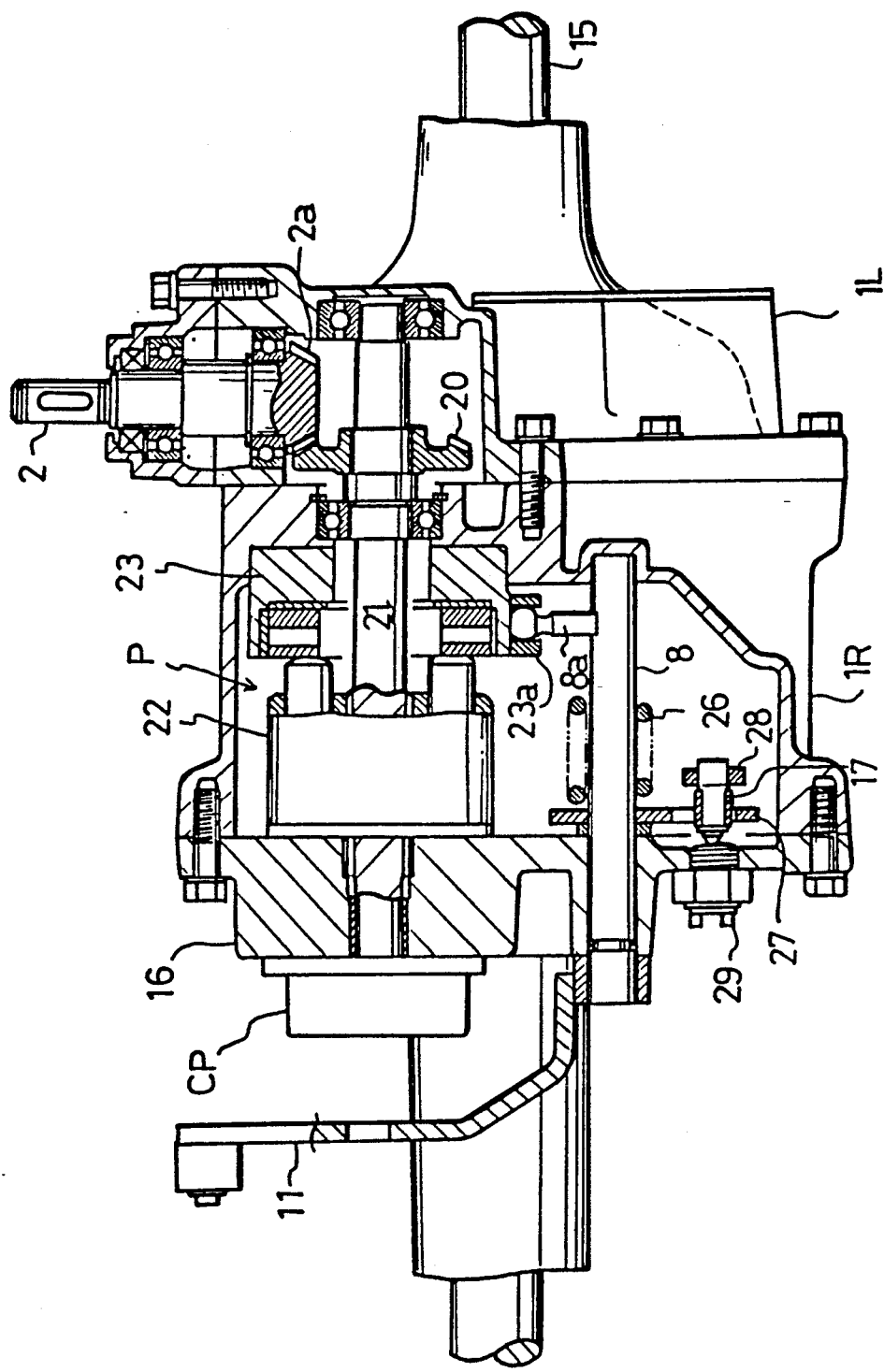
FIG. 3 is a section taken along the line 3—3 in FIG. 2.
Figure 4:
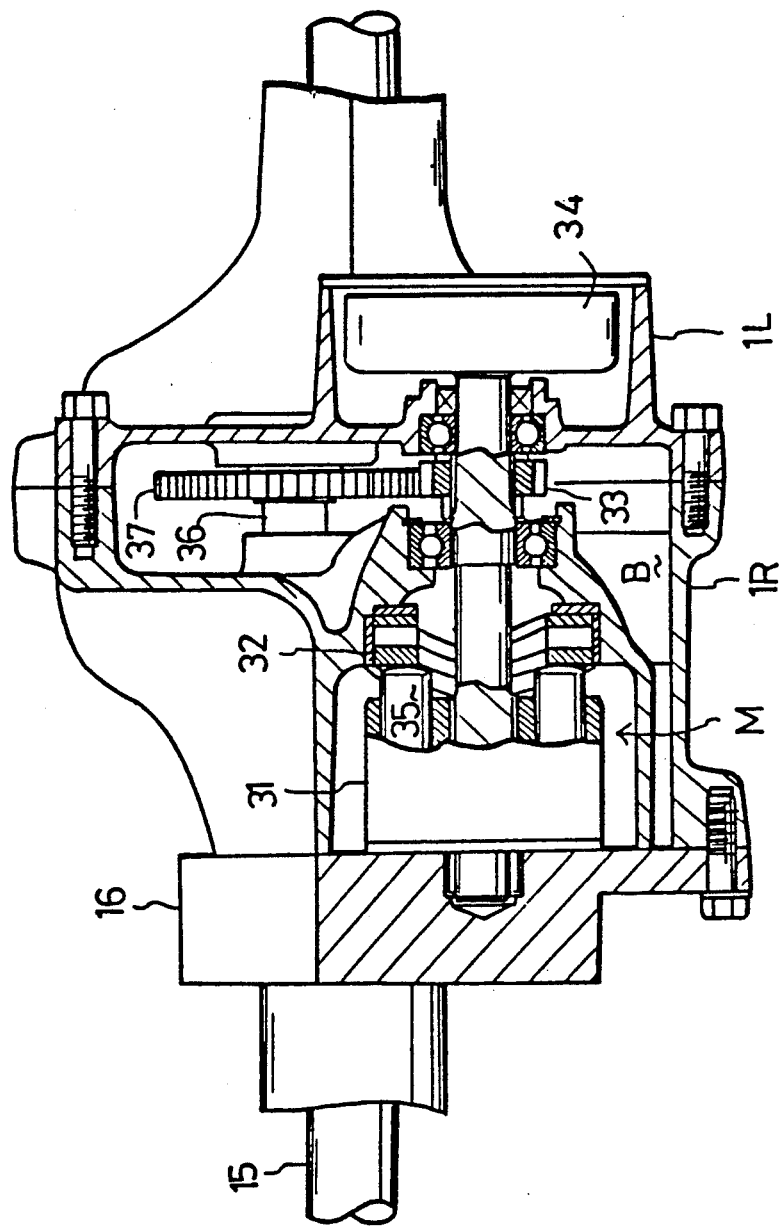
FIG. 4 is a section taken along the line 4—4 in FIG. 2.

As best seen in FIG. 3, the movable swash plate 23 has a recessed portion 23a formed at one end thereof which receives a projection 8a extending from the movable swash plate control shaft 8, so that as the movable swash plate control shaft 8 is pivoted, the movable swash plate 23 tilts to vary the amount of projection of the pistons 24 to thereby change the amount of discharge of hydraulic fluid.

The hydraulic motor M is such that a cylinder 31 and a fixed swash plate 32 are fitted on the motor shaft 30 which is horizontally mounted between the transmission case 1 and center section 16. Cylinder 31 has a plurality of pistons 35 fitted therein around the motor shaft 30. The heads of the pistons 35 are held in abutment with the fixed swash plate 32.

Oil passages 16a, 16b formed in the center section 16 as shown in FIG. 5 respectively intercommunicate the cylinders 31 and 22, so that pressurized oil is supplied from the hydraulic pump P to the hydraulic motor M through the oil passages 16a, 16b whereby when pump shaft 21 is pivoted by power from the engine, the hydraulic motor M is thus driven.

In this case, the movable swash plate control shaft 8 is pivoted by stepping on the speed change pedal 12, so that the angle of the movable swash plate 23 is changed and the amount of pressurized oil discharge is changed, thus affecting the speed change.

The movable swash plate control shaft 8 has a lock arm 27 fixed thereto and springs 26 fitted thereon, so that it is biased by the springs 26 to normally keep the movable swash plate 23 in a neutral position. When the brake pedal is stepped on, an interlock arm 28 fixed to the brake shaft 7 is pivoted to turn a safety switch 29 on (FIG. 3), only in which case the engine is enabled to start. Where the amount of play of the brake pedal is not appropriate, the engine is not allowed to start.

When the brake pedal is stepped on, the movable swash plate control shaft 8 is forcibly pivoted by the interlock arm 28 via the lock arm 27 to the neutral position.

On the motor shaft 30, at the second recess B side, are fixedly mounted a gear 33 and a brake drum 34, the brake drum 34 being able to perform braking action when a brake shoe is brought in abutment therewith by pivoting of a stop brake lever. A large-diameter gear 37 securely mounted on the intermediate shaft 36 is in mesh engagement with the gear 33, and a ring gear 39 of a deflector D is in mesh engagement with a gear 36a on the intermediate shaft 36, whereby power is transmitted to the axle 15.

Figure 6:
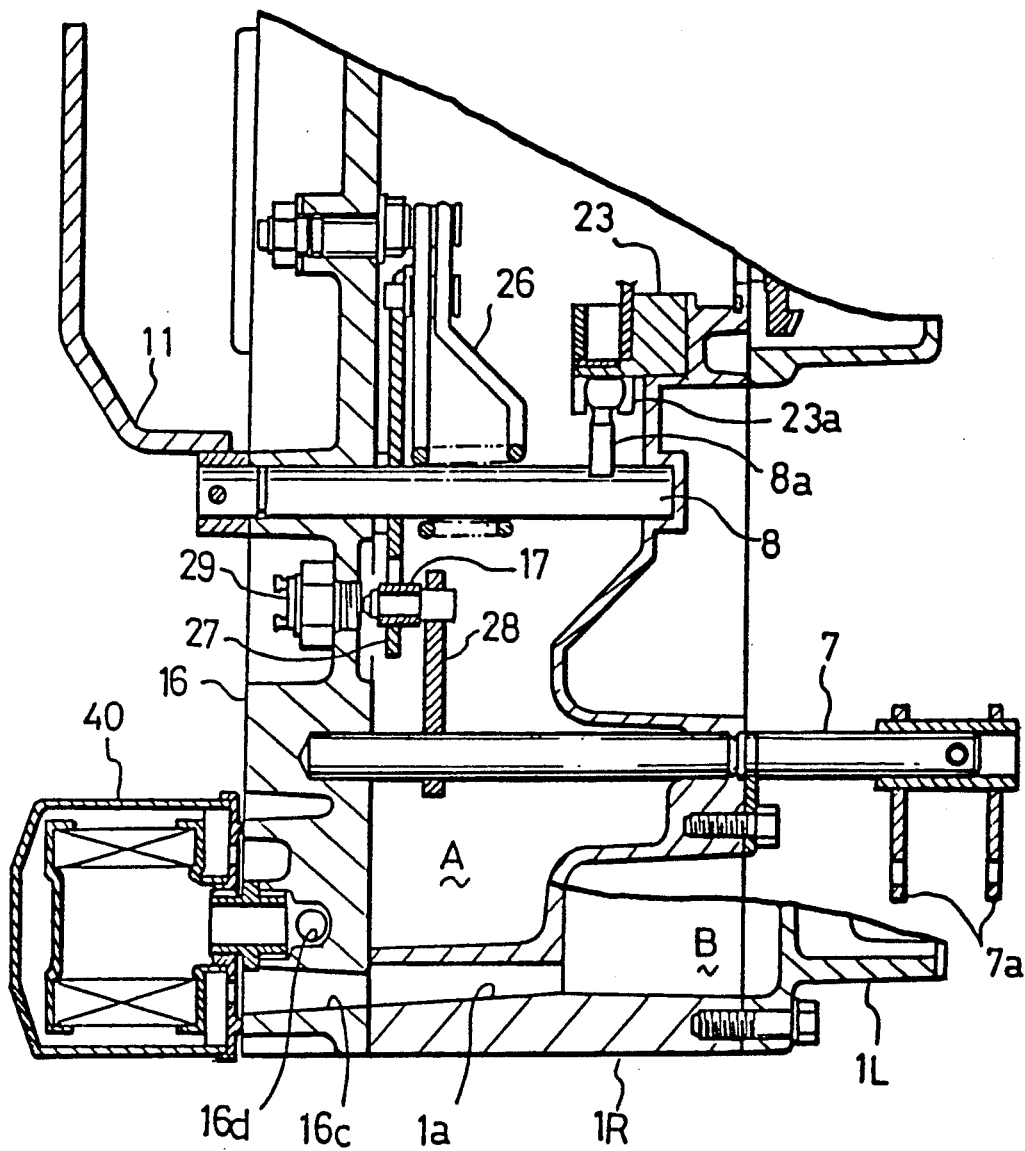
FIG. 6 is a sectional view showing a suction portion.

Further, as FIG. 6 shows, a filter 40 is fixed to the exterior of a lower portion of the center section 16. The suction side of the filter 40 is in communication with an oil suction passage 16c bored in the center section 16. The oil suction passage 16c communicates through an oil passage 1a bored in the split case portion 1R with the second recess B in which gears are housed, so that lubricating oil injected into the gear side of the recess B is sucked in as hydraulic oil for filtration. The discharge side of the filter 40 acts to supply hydraulic fluid through the oil passage 16d toward a charge pump CP (FIG. 3) of the HST speed change gearing.

Constructed as above described, the invention provides the following advantages.

The hydraulic pump and hydraulic motor are disposed at different levels, upper and lower, in longitudinally staggered relation. Therefore, the transmission case is compact in construction because it is dimensionally limited to a minimum in both vertical and horizontal directions. Thus, the hydraulic pump shaft can be disposed at a relatively low position and accordingly it is possible to obtain a simplified arrangement for power transmission.

The arrangement provides for effective utilization of the space formed below the hydraulic pump P. Therefore, it is possible to provide a compact arrangement free of dead space.

The arrangement makes it possible to incorporate the hydraulic pump P, hydraulic motor M and the mechanism for power transmission into the split case portion 1R from different sides. This provides for simplification of the assembly process. The center section 16 which is relatively heavier is only required to be large enough to close the first recess A, and this provides for reduction in the weight of the axle drive apparatus.

The arrangement eliminates the need for an exclusive housing for integrally housing the hydraulic pump P and hydraulic motor M. Therefore, the swash plates 23, 32 are only required to be covered with two split case portions 1R, 1L. Thus, it is possible to prevent vibrations and noise arising from the swash plates 23, 32 from flowing outside.

What is claimed is:

1. An axle drive apparatus comprising:
   a transmission case;
   an axle disposed within said transmission case;
   a hydraulic pump disposed within said transmission case, having a shaft adapted to be driven by an engine;
   a hydraulic motor disposed within said transmission case, having a shaft for driving said axle;
   wherein said pump shaft, said motor shaft and said axle are arranged within said transmission case with their axes of rotation disposed in parallel to one another;
   wherein said pump shaft and said motor shaft are oppositely disposed relative to an imaginary horizontal line passing through the axis of said axle so that said pump shaft is positioned above said horizontal line and said motor shaft is positioned below said horizontal line, such that said pump shaft and said motor shaft are held in a longitudinally staggered relation within said transmission case; and
   wherein said pump and said motor are both disposed on one side of a plane perpendicular to said imaginary horizontal line and said axle is disposed on a side of said plane opposite to said one side.

2. An axle drive apparatus as set forth in claim 1, wherein said hydraulic pump is of the variable capacity type and wherein a control unit for said hydraulic pump is disposed in a space within said transmission case defined below said hydraulic pump.

3. An axle drive apparatus as set forth in claim 1, wherein said transmission case is separable along a plane perpendicular to said axle into two case portions, one case portion being formed at one side thereof with a first recess for housing said hydraulic pump and said hydraulic motor, and being formed at the other side thereof with a second recess for housing a power transmission mechanism which connects said axle to said hydraulic motor, said first recess being closed by a center section which hydraulically connects said hydraulic pump with said hydraulic motor, said second recess being closed by said other case portion.

4. An axle drive apparatus as set forth in claim 3, wherein said hydraulic pump and said hydraulic motor are of the axial piston type and have swash plates supported by a wall of said first recess in perpendicular relation to said hydraulic pump shaft and wherein said pump shaft is geared to an input shaft supported by one of said case portions.

* * * * *